US011090827B2

(12) United States Patent
Yamamoto et al.

(10) Patent No.: US 11,090,827 B2
(45) Date of Patent: Aug. 17, 2021

(54) CUTTING DEVICE

(71) Applicant: Murata Manufacturing Co., Ltd., Nagaokakyo (JP)

(72) Inventors: Takeshi Yamamoto, Nagaokakyo (JP); Hideyasu Kamigawa, Nagaokakyo (JP); Masayuki Sumita, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/750,187

(22) Filed: Jan. 23, 2020

(65) Prior Publication Data
US 2020/0156276 A1 May 21, 2020

Related U.S. Application Data

(63) Continuation of application No. PCT/JP2018/030120, filed on Aug. 10, 2018.

(30) Foreign Application Priority Data

Aug. 21, 2017 (JP) .............................. JP2017-158839

(51) Int. Cl.
*B26D 1/06* (2006.01)
*B26D 5/00* (2006.01)
(Continued)

(52) U.S. Cl.
CPC .............. *B26D 1/06* (2013.01); *B26D 5/007* (2013.01); *B26D 7/02* (2013.01); *B26D 7/0683* (2013.01); *H01M 50/403* (2021.01); *H01M 50/46* (2021.01)

(58) Field of Classification Search
CPC . B26D 1/06; B26D 5/007; B26D 7/02; B26D 7/0683; H01M 50/403; H01M 50/46
See application file for complete search history.

(56) References Cited

U.S. PATENT DOCUMENTS 4,386,465 A * 6/1983 Ezaki ..................... A23G 9/285
30/114
6,032,561 A * 3/2000 Lonn ...................... A21C 15/04
83/318
(Continued)

FOREIGN PATENT DOCUMENTS

CN 202290986 U 7/2012
CN 106313453 A 1/2017
(Continued)

OTHER PUBLICATIONS

International Search Report issued for PCT/JP2018/030120, dated Sep. 25, 2018.
(Continued)

*Primary Examiner* — Omar Flores Sanchez
(74) *Attorney, Agent, or Firm* — Arent Fox LLP

(57) ABSTRACT

A cutting device includes a guide extending in a vertical direction, a cutting mechanism that includes a cutting blade and that moves in the vertical direction along the guide, a drive device that moves the cutting mechanism in a horizontal direction by moving the guide in the horizontal direction, a pressing device that presses the cutting mechanism from above, and a reception base on which a cutting object is placed and that receives the cutting blade during the cutting movement. During cutting of the cutting object, the cutting mechanism pressed by the pressing device is moved downward along the guide and cuts the cutting object placed on the reception base with the cutting blade.

16 Claims, 7 Drawing Sheets

(51) Int. Cl.
  *B26D 7/02* (2006.01)
  *B26D 7/06* (2006.01)
  *H01M 50/46* (2021.01)
  *H01M 50/403* (2021.01)

(56) References Cited

U.S. PATENT DOCUMENTS 9,596,867 B2 * 3/2017 Miller ................ A22C 17/0006
2010/0024503 A1 2/2010 Bradley et al.

FOREIGN PATENT DOCUMENTS

| JP | 200188093 A | 4/2001 |
| JP | 4418940 B2 | 2/2010 |
| JP | 201632848 A | 3/2016 |

OTHER PUBLICATIONS

Written Opinion of the International Searching Authority issued for PCT/JP2018/030120, dated Sep. 25, 2018.

* cited by examiner

CUTTING DEVICE

CROSS REFERENCE TO RELATED APPLICATIONS

The present application is a continuation of PCT/JP2018/030120 filed Aug. 10, 2018, which claims priority to Japanese Patent Application No. 2017-158839, filed Aug. 21, 2017, the entire contents of each of which are incorporated herein by reference.

TECHNICAL FIELD

The present invention relates to a cutting device for cutting a cutting object.

BACKGROUND

Patent Document 1 (identified below) describes a cutting device that includes a cutting blade, a cutting blade movement means for moving the cutting blade, and a reception base for receiving the cutting blade.

Patent Document 1: Japanese Patent Application Laid-Open No. 2016-32848.

However, the cutting device described in Patent Document 1 is configured such that the entire cutting device excluding the reception base moves to perform cutting with the cutting blade. Therefore, a large load is applied to the cutting blade movement means. Therefore, the cutting blade movement means to which a large load is applied is required to have high rigidity, resulting in an increase in size of the cutting device.

SUMMARY OF THE INVENTION

Accordingly, it is an object of the present invention to provide a cutting device that can suppress application of a large load to the cutting blade movement means and suppress an increase in size.

A cutting device of an exemplary embodiment includes a guide extending in a vertical direction; a cutting mechanism including a cutting blade and that is configured to move in the vertical direction along the guide; a drive device configured to move the guide in a horizontal direction to move the cutting mechanism in the horizontal direction; a pressing device configured to press the cutting mechanism from above; and a reception base on which a cutting object is placed and which is configured to receive the cutting blade during cutting of the cutting object. Moreover, according to an exemplary aspect, during cutting of the cutting object, the cutting mechanism pressed by the pressing device is configured to move downward along the guide and cut the cutting object placed on the reception base with the cutting blade.

In an exemplary aspect, the cutting device can further include a support configured to support the pressing device, wherein a relative position of the cutting mechanism relative to the support in the horizontal direction can be changed by movement of the guide by the drive device.

In another exemplary aspect, the cutting object has an elongated shape and the cutting device can further include a cutting object feed device configured to feed the cutting object in one direction; a first clamp device configured to clamp one end side of a predetermined region including a cutting object portion of the cutting object; a second clamp device configured to clamp another end side of the predetermined region of the cutting object; and a clamp movement device configured to move the first clamp device and the second clamp device in a state of clamping the cutting object at any speed when the cutting object is fed in the one direction.

The clamp movement device can further be configured to adjust movement speed of the first clamp device and the second clamp device such that tension in the predetermined region of the cutting object becomes substantially zero.

In another aspect, the cutting device can further include a carrier film feed device configured to feed an elongated carrier film to be placed below the cutting object having an elongated shape.

Moreover, the cutting device can further include a static elimination device configured to perform static elimination of the cutting object and the carrier film before the cutting object overlaps with the carrier film.

The cutting device of the exemplary embodiments is configured such that a cutting mechanism pressed by a pressing device moves downward along a guide and cuts a cutting object placed on a reception base using a cutting blade of the cutting mechanism. That is, during cutting of the cutting object, the cutting mechanism including the cutting blade moves toward the cutting object, but the guide and a drive device do not move. Accordingly, a large load is not applied to the guide or the drive device, and therefore it is not necessary to increase the rigidity, enabling suppression of an increase in size of the device.

DETAILED DESCRIPTION

A feature of the present invention is described below in more details in conjunction with embodiments of the present invention.

First Exemplary Embodiment

Figure 1:
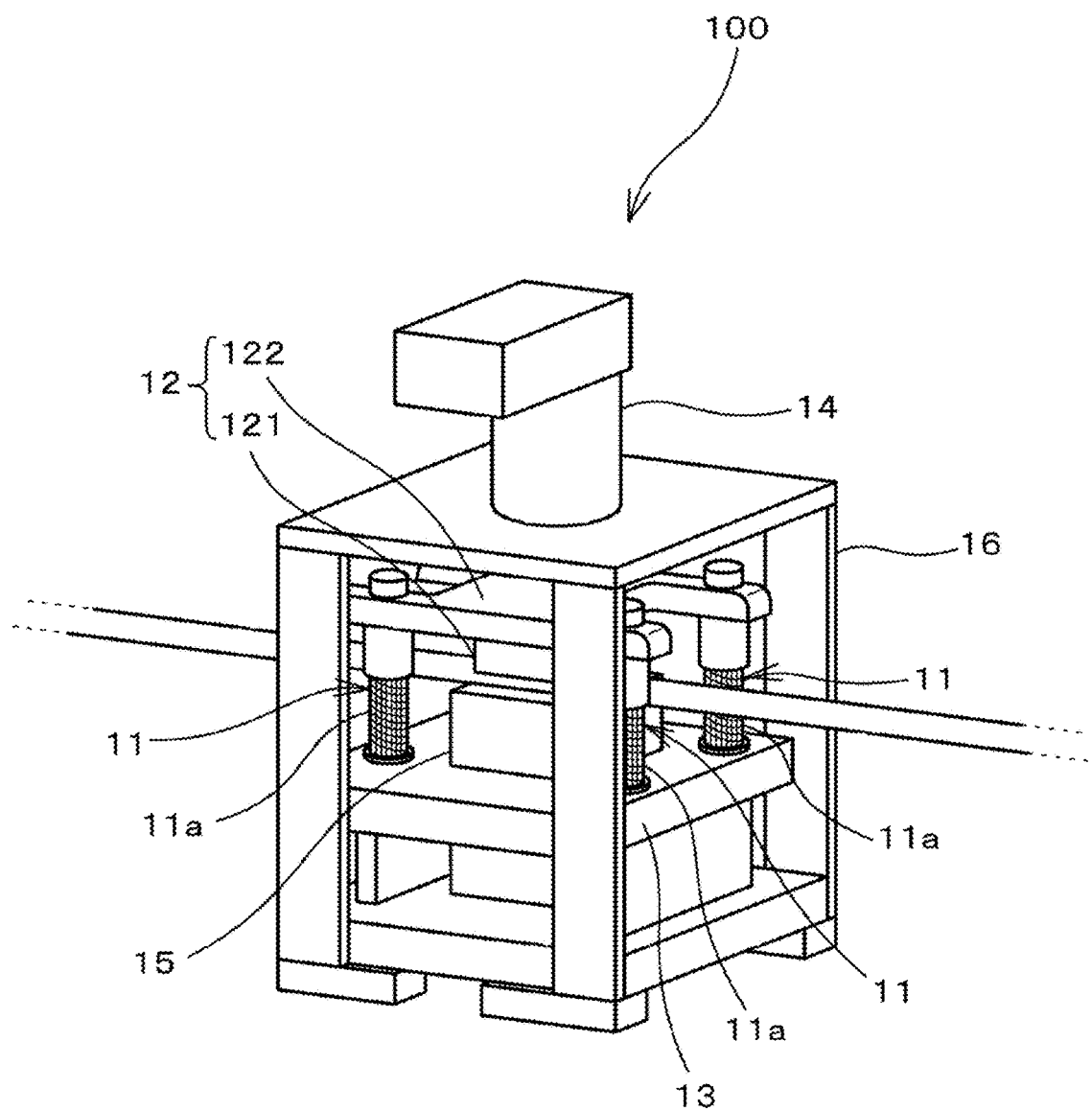
FIG. 1 is a perspective view illustrating external appearance of a main configuration portion of a cutting device according to a first exemplary embodiment.
Figure 2:
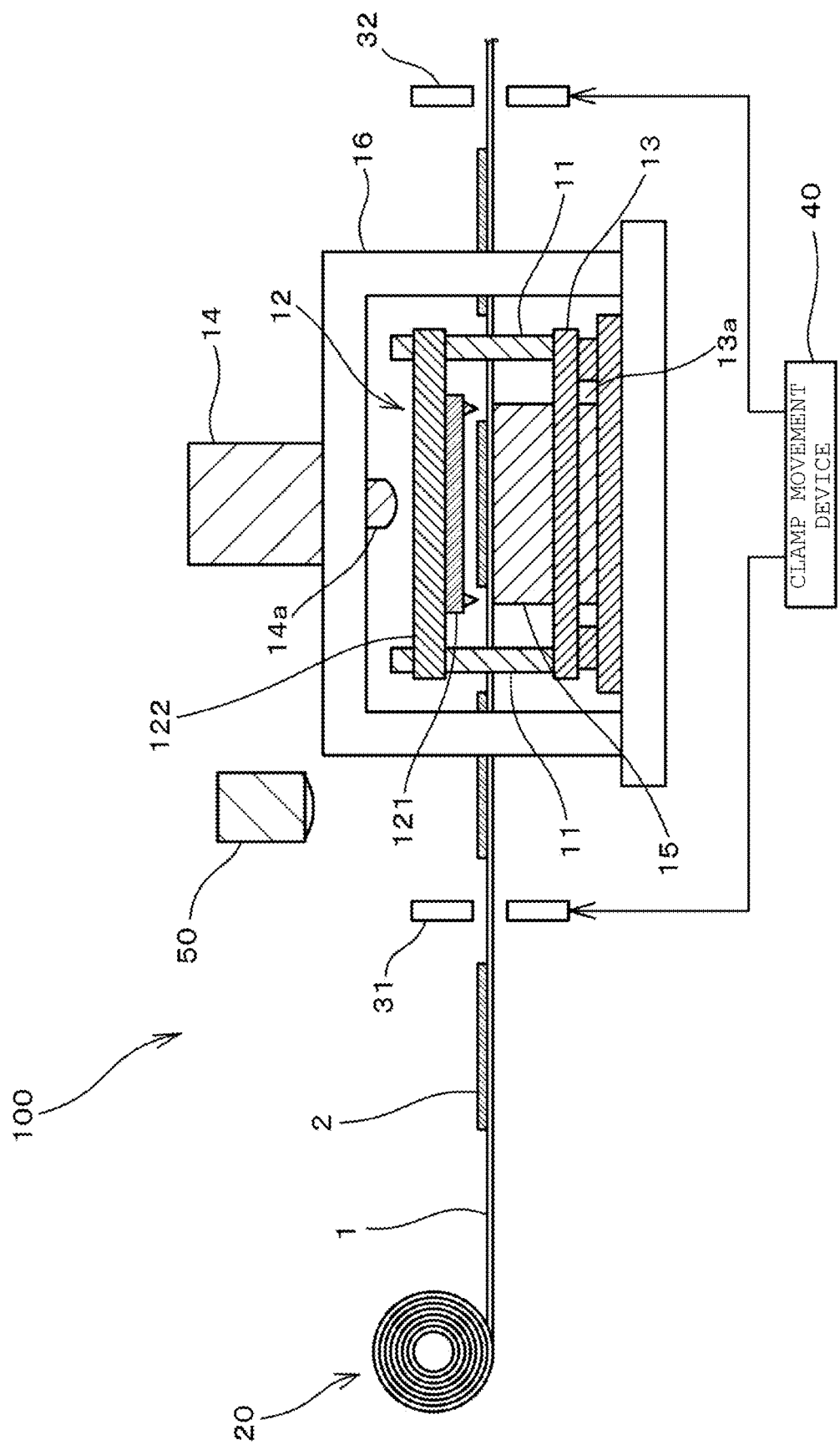
FIG. 2 is a schematic view of the cutting device according to the first exemplary embodiment when viewed from a side.

FIG. 1 is a perspective view illustrating external appearance of a main configuration portion of a cutting device 100 according to a first exemplary embodiment. Moreover, FIG. 2 is a schematic view of the cutting device 100 according to the first exemplary embodiment when viewed from side.

An example is described below in which an elongated separator material 1, more specifically, an elongated separator material 1 to which an electrode 2 (see FIG. 2) is bonded is cut with the cutting device 100. However, it is noted that the cutting object is not limited to a separator material.

The cutting device 100 according to the first embodiment includes guides 11, a cutting mechanism 12, a drive device 13, a pressing device 14, a reception base 15, a support 16, a separator material feed device 20, a first clamp device 31, a second clamp device 32, a clamp movement device 40, and an imaging device 50.

As shown the guides 11 extend in a vertical direction, and a lower end side is fixed to the drive device 13. In the present embodiment, four guides 11 are provided, but the number of guides 11 is not limited to four according to alternative aspects.

Moreover, the cutting mechanism 12 includes a cutting blade 121 and a die set 122 for cutting the separator material 1, which is a cutting object. The cutting blade 121 is provided on a lower surface of the die set 122. Moreover, the die set 122 includes through-holes, and is configured to be slidable in the vertical direction along the guides 11 with the guides 11 being extending through the through-holes. Thus, the cutting mechanism 12 is configured to move in the vertical direction along the guides 11.

For example, as illustrated in FIG. 1, a spring 11a is provided on a lower outer circumference of the guides 11, and the die set 122 of the cutting mechanism 12 is configured to be supported by the springs 11a. The springs 11a are supported by the drive device 13. Thus, when the die set 122 is pushed downward from above by the pressing device 14, which will be described later, the springs 11a are contracted and the cutting mechanism 12 moves vertically downward. However, the configuration in which the cutting mechanism 12 moves vertically downward along the guides 11 is not limited to the aforementioned configuration.

The drive device 13 is a device for moving the cutting mechanism 12 in a horizontal direction by moving the guides 11 in the horizontal direction. In the present embodiment, the drive device 13 is supported by the support 16.

Figure 3:
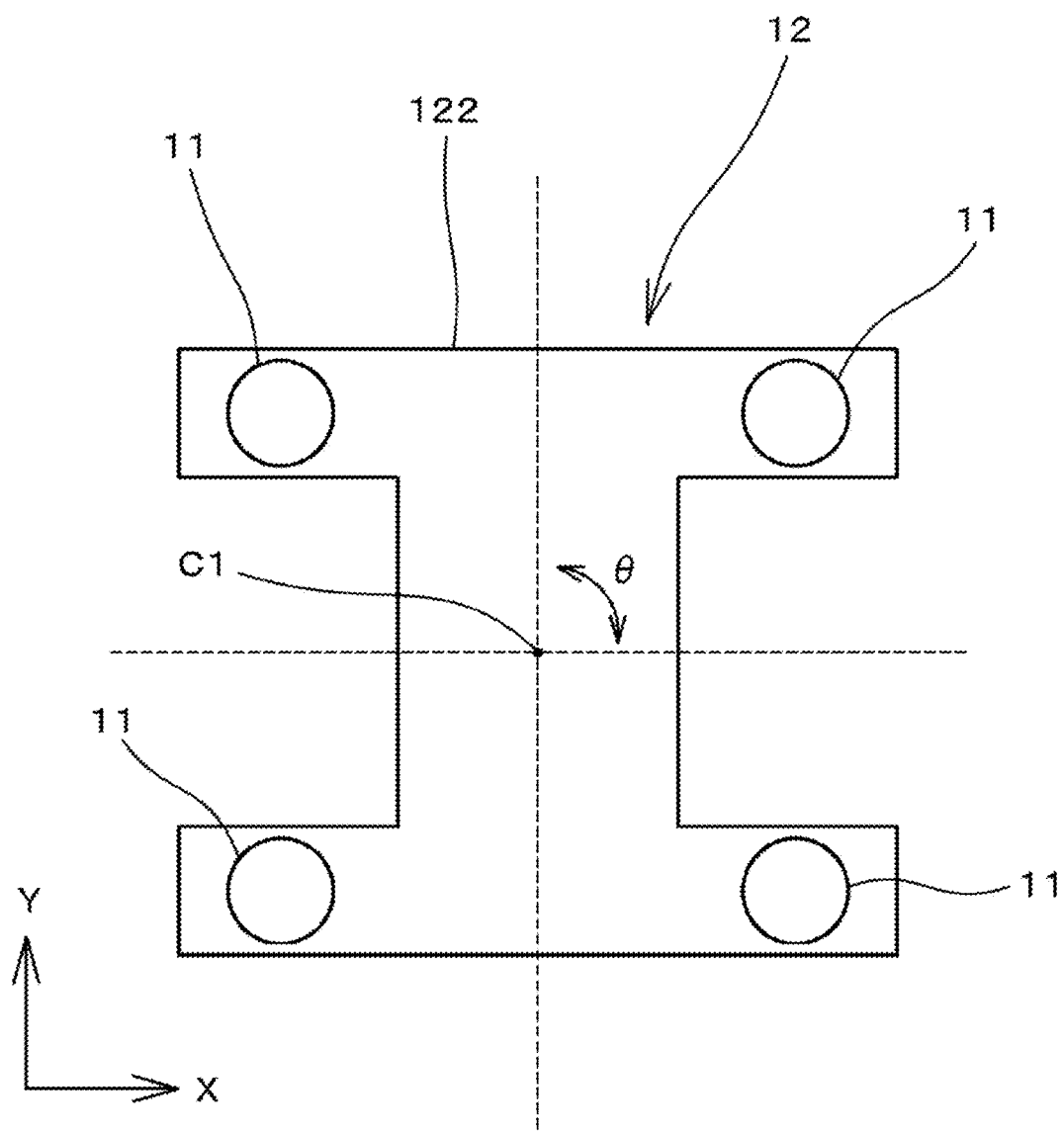
FIG. 3 is a plan view for explaining a movement direction of a guide and a cutting mechanism.

FIG. 3 is a plan view for explaining a movement direction of the guides and the cutting mechanism. In the present embodiment, the drive device 13 is configured to move the guides 11 and the cutting mechanism 12 in an X-axis direction, a Y-axis direction, and a θ direction, which is a rotation direction about center C1 of the die set 122, illustrated in FIG. 3.

The pressing device 14 is attached to the support 16 and supported by the support 16. During cutting of the separator material 1, when an extension 14a of the pressing device 14 extends downward, the extension 14a abuts the cutting mechanism 12 positioned below and presses the cutting mechanism 12 from above. As described above, the cutting mechanism 12 is configured to move in the vertical direction along the guides 11 and therefore moves vertically downward by being pressed by the pressing device 14. Then, the separator material 1 positioned on the reception base 15 is cut by the cutting blade 121 provided on the lower surface of the die set 122.

It is noted that a method for driving the extension 14a of the pressing device 14 is not particularly limited, but may be driving using a servo motor or may be driving using a cylinder.

The cutting device 100 of the present embodiment is configured such that a relative position in the horizontal direction relative to the support 16 of the cutting mechanism 12 is changed by the movement of the guides 11 by the drive device 13. When the guides 11 and the cutting mechanism 12 are moved in the horizontal direction by the drive device 13, the pressing device 14 supported by the support 16 does not move in the horizontal direction.

The reception base 15 functions to support the separator material 1 and receive the cutting blade 121 during cutting of the separator material 1 fed from the separator material feed device 20 using the cutting blade 121. In the present embodiment, a hole 13a is formed in a central portion of the drive device 13 in plan view, and the reception base 15 is configured to extend through the hole 13a.

The separator material feed device 20, a cutting object feed device, is a device for unwinding the elongated separator material 1, which is wound into a roll shape, for example, and feeding the separator material 1 in one direction.

The first clamp device 31 clamps one end side in a predetermined region including a cutting object portion of the separator material 1. Moreover, the second clamp device 32 clamps the other end side of the predetermined region of the separator material 1 opposite the first end.

The clamp movement device 40 is a device for moving the first clamp device 31 and the second clamp device 32 in a state of clamping the separator material 1 at any speed when the separator material 1 is fed in the one direction by the separator material feed device 20. In the present embodiment, the clamp movement device 40 adjusts the movement speed of the first clamp device 31 and the second clamp device 32 such that the tension in the predetermined region clamped by the first clamp device 31 and the second clamp device 32 becomes substantially zero.

In addition, according to the exemplary aspect, the imaging device 50 captures an image of the electrode 2 placed on the separator material 1 and a surrounding portion.

Figure 4:
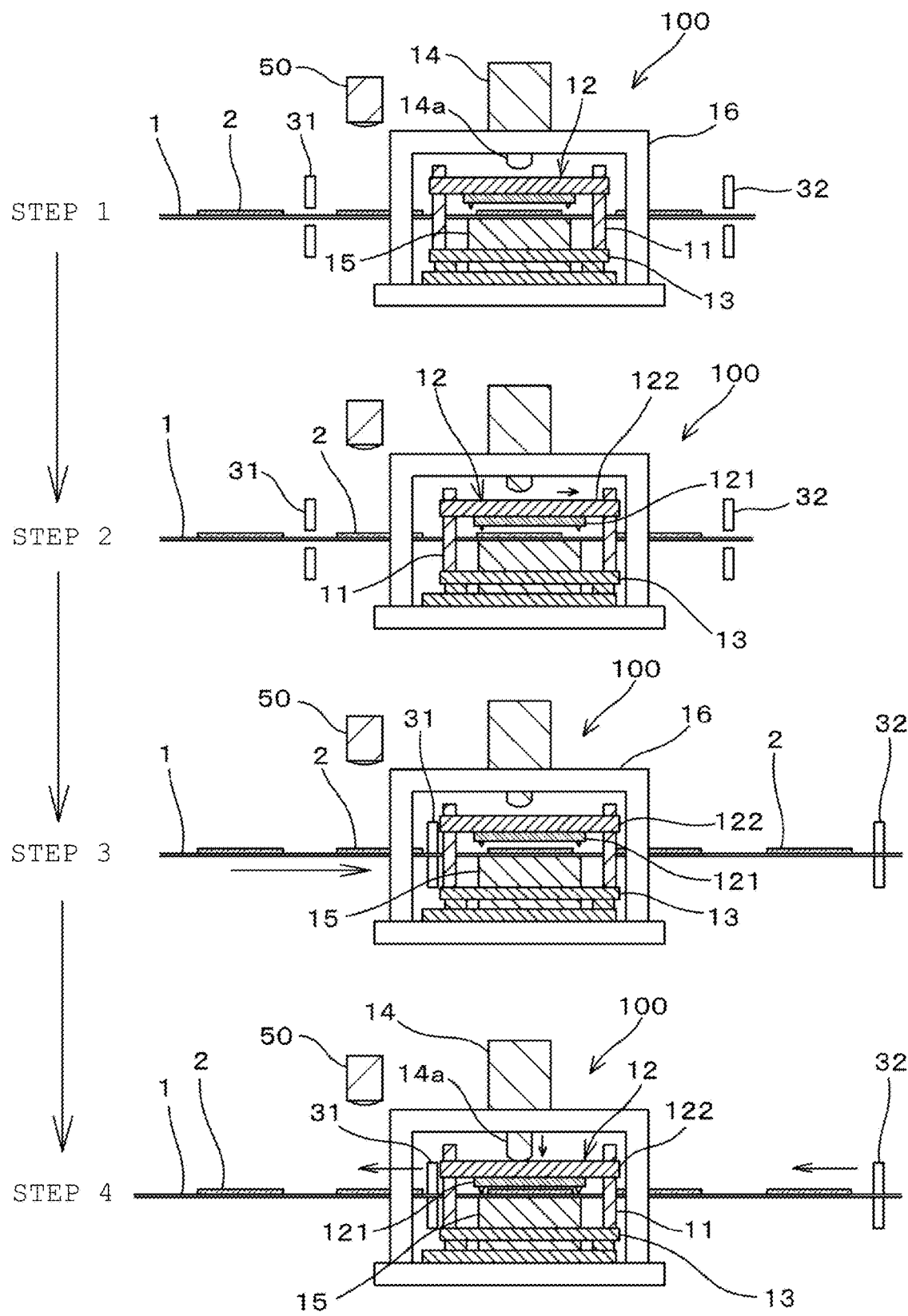
FIG. 4 is a view for explaining a method of cutting a portion of a separator material, on which an electrode is stacked, around the electrode, using the cutting device according to the first exemplary embodiment.
Figure 5:
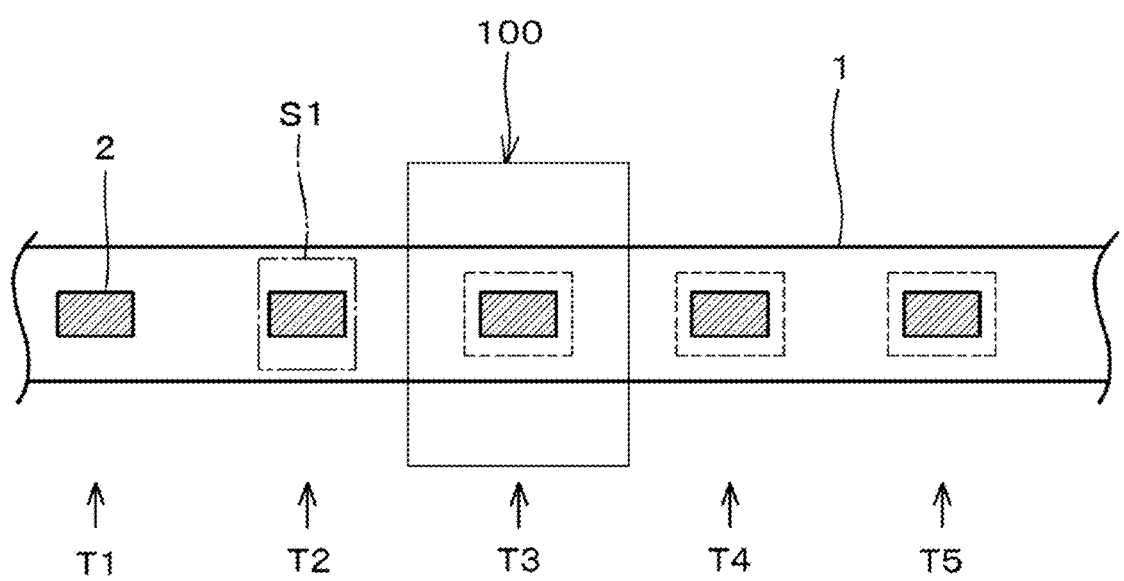
FIG. 5 is a plan view illustrating a portion of an elongated separator material, for explaining a position at which each processing is performed.

FIG. 4 is a view for explaining a method of cutting a portion of the separator material 1, on which the electrode 2 is bonded, around the electrode 2, using the cutting device 100 according to the first embodiment. Moreover, FIG. 5 is a plan view illustrating a portion of the elongated separator material 1, which is a view illustrating a position at which each processing is performed. It is noted that, in FIG. 4, the separator material feed device 20 and the clamp movement device 40 are omitted. A cutting method using the cutting device 100 is described below with reference to FIGS. 4 and 5.

In first position T1 of FIG. 5, the electrode 2 is placed on the separator material 1, and the separator material 1 and the electrode 2 are pressure-bonded.

After the separator material 1 and the electrode 2 are pressure-bonded, the separator material 1 is moved by the separator material feed device 20 such that the electrode 2 is positioned in second position T2.

In the second position T2, processing of step 1 by the imaging device 50 is performed.

That is, in step 1 illustrated in FIG. 4, the imaging device 50 captures an image of the electrode 2 on the separator material 1 and a surrounding portion. Range S1 illustrated in FIG. 5 is a range captured by the imaging device 50 that includes the electrode 2 as shown.

It is also noted that, in the first position T1, a next electrode 2 is placed on the separator material 1 and is pressure-bonded to the separator material 1 in an exemplary aspect.

In step 2 after step 1, the drive device 13 moves the guides 11 in the horizontal direction on the basis of the position or inclination of the electrode 2 whose image is captured by the imaging device 50. More specifically, the drive device 13 moves the cutting mechanism 12 in the horizontal direction by moving the guides 11 in at least one direction among the X-axis direction, the Y-axis direction, and the θ direction on the basis of the position or inclination of the image-captured electrode 2.

Thus, the position of the cutting blade 121 in the horizontal direction is corrected depending on the position or inclination of the electrode 2.

In step 3 after step 2, first, the first clamp device 31 and the second clamp device 32 clamp the separator material 1. Then, the separator material feed device 20 moves the separator material 1 in a state of being clamped by the first clamp device 31 and the second clamp device 32 such that the electrode 2 positioned in the second position T2 is positioned in third position T3 as shown in FIG. 5. Note that FIG. 4 illustrates a state in which the electrode 2 positioned in the second position T2 has moved to the third position T3.

At this time, the clamp movement device 40 moves the first clamp device 31 and the second clamp device 32 while adjusting the movement speed of the first clamp device 31 and the second clamp device 32 such that the tension in the predetermined region clamped by the first clamp device 31 and the second clamp device 32 becomes substantially zero.

In step 4 after step 3, the separator material 1 is cut in the third position T3 as shown in FIG. 5. That is, when the extension 14a of the pressing device 14 extends downward and presses the cutting mechanism 12 from above, the cutting mechanism 12 moves downward along the guides 11 and cuts the separator material 1 with the cutting blade 121.

During cutting of the separator material 1 with the cutting blade 121, the drive device 13 and the guides 11 do not move in the vertical direction, but only the cutting mechanism 12 including the cutting blade 121 moves in the vertical direction. With such a configuration, a large load is not applied to the drive device 13 or the guides 11, high rigidity is not necessary.

While the separator material 1 is cut by the cutting blade 121, the clamp movement device 40 moves the first clamp device 31 and the second clamp device 32 to the original positions. At this time, the separator material 1 is clamped and immobilized by a pair of clamp devices, which is not illustrated, positioned on both outer sides of the first clamp device 31 and the second clamp device 32 in the feed direction of the separator material 1.

Then, as the separator material 1 is fed in the one direction, the electrode 2 moved to fifth position T5, as also shown in FIG. 5, is sucked by a pickup device, which is not illustrated, and conveyed to a predetermined stacking position together with the bonded separator. That is, in the predetermined stacking position, the separator on which the electrodes 2 are bonded is stacked, and an electrode body of a battery cell is manufactured. The electrode 2 is a positive electrode or a negative electrode, and the separator to which the electrodes 2 are bonded is stacked in an aspect in which the positive electrode and the negative electrode are alternately stacked with the separator interposed therebetween.

It is noted that, in the present embodiment, fourth position T4 is close to the cutting device 100, and therefore suction by the pickup device, which is not illustrated, cannot be performed. Therefore, in fourth position T4, particular processing is not performed, and suction and conveyance by the pickup device are performed in the fifth position T5.

With the cutting device 100 of the exemplary embodiment of the present invention, during cutting of the separator material 1, which is a cutting object, the cutting mechanism 12 pressed by the pressing device 14 moves downward along the guides 11 and cuts the separator material 1 placed on the reception base 15 using the cutting blade 121. That is, during cutting of the cutting object, the guides 11 and the drive device 13 do not move in the vertical direction, but only the cutting mechanism 12 including the cutting blade 121 moves toward the separator material 1. Therefore, a large load is not applied to the guides 11 or the drive device 13, and high rigidity is not necessary. Thus, it is possible to suppress increases in size and cost of the cutting device 100.

In particular, the cutting device 100 of the exemplary embodiment of the present embodiment is configured such that a relative position in the horizontal direction relative to the support 16 of the cutting mechanism 12 is changed by the movement of the guides 11 by the drive device 13. The pressing device 14 is supported by the support 16 and does not move in the horizontal direction. That is, during adjustment of the cutting position, the guides 11 and the cutting mechanism 12 are configured to be moved in the horizontal direction by the drive device 13, and during cutting of the separator material 1, the cutting mechanism 12 is configured to be moved vertically downward by the pressing device 14. Thus, a large load is not applied to the guides 11 or the drive device 13, and therefore it is not necessary to increase the rigidity, enabling suppression of increases in size and cost of the cutting device 100.

Moreover, with the cutting device 100 of the present embodiment, the clamp movement device 40 is configured to move the first clamp device 31 and the second clamp device 32 in a state of clamping the separator material 1 at any speed when the elongated separator material 1 is fed in the one direction. Therefore, it is possible to adjust the tension of the separator material 1 to be cut to a desired value. Thus, the separator material 1 can be cut precisely.

In particular, the clamp movement device 40 adjusts the movement speed of the first clamp device 31 and the second clamp device 32 such that the tension in the predetermined region of the separator material 1 between the first clamp device 31 and the second clamp device 32 becomes substantially zero. Therefore, it is possible to suppress contraction of the separator obtained after cutting. Moreover, misalignment can occur due to contraction of the separator. However, as described above, suppressing contraction of the separator can also suppress occurrence of misalignment.

Second Exemplary Embodiment

In the aforementioned first exemplary embodiment, cutting of the elongated separator material 1 is described. In the second embodiment, a carrier film is placed below the separator material 1, and the separator material 1 on the carrier film is cut.

Figure 6:
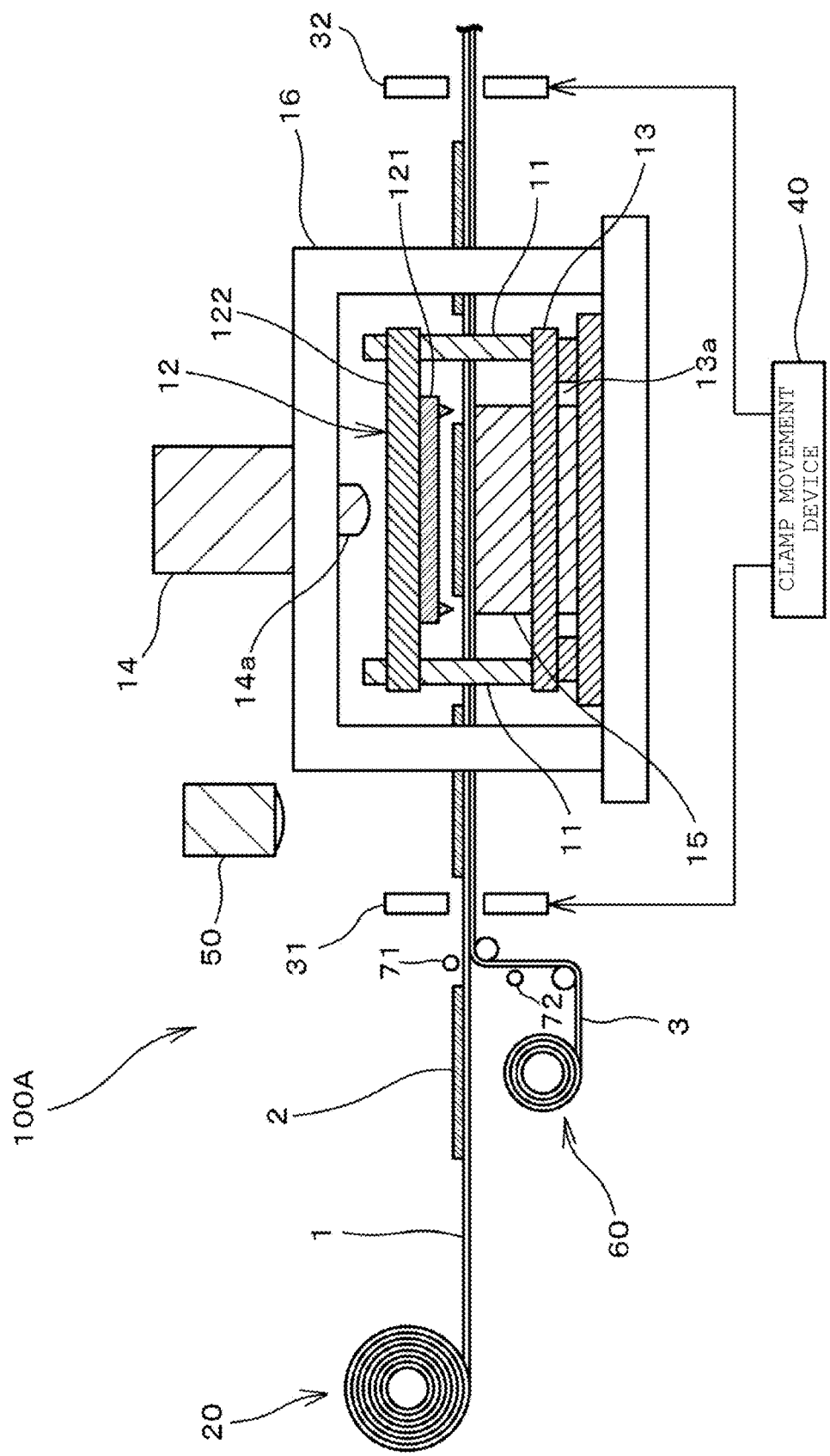
FIG. 6 is a side view illustrating a configuration of a cutting device according to a second exemplary embodiment.

FIG. 6 is a side view illustrating a configuration of a cutting device 100A according to the second embodiment. The cutting device 100A of the second embodiment, in addition to the configuration of the cutting device 100 of the first embodiment, further includes a carrier film feed device 60, a first static elimination device 71, and a second static elimination device 72. The first static elimination device 71 and the second static elimination device 72 correspond to a "static elimination device" of the present disclosure.

The carrier film feed device 60 feeds an elongated carrier film 3 to be placed below the elongated separator material 1. The carrier film 3 is, for example, a PET film. The carrier film 3 overlaps with the separator material 1 in front of the position in which the first clamp device 31 is arranged in a traveling direction of the separator material 1.

The first static elimination device 71 is configured to perform static elimination on the separator material 1 before the separator material 1 overlaps with the carrier film 3. The second static elimination device 72 is configured to perform static elimination on the carrier film 3 before the carrier film 3 overlaps with the separator material 1. In general, the first static elimination device 71 and the second static elimination device 72 can be any device that can perform static elimination as would be appreciated to one skilled in the art. For example, a static elimination wire can be used.

Static elimination on the separator material 1 by the first static elimination device 71 and static elimination on the carrier film 3 by the second static elimination device 72 are preferably performed immediately before the separator material 1 overlaps with the carrier film 3.

Figure 7:
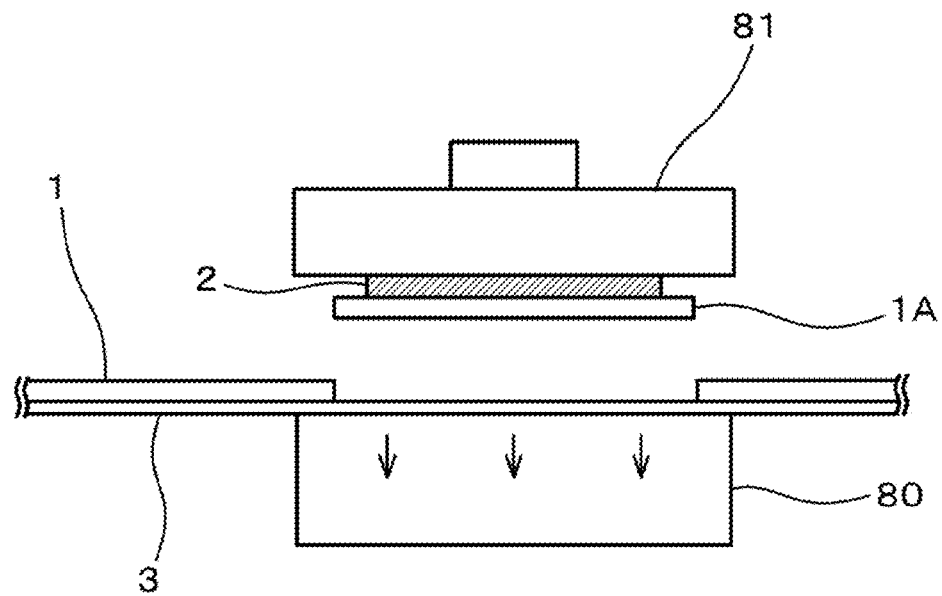
FIG. 7 is a view illustrating a pickup device for picking up a separator to which an electrode is bonded and a suction base for sucking a carrier film.

After the separator material 1 is cut by the cutting device 100A, a separator 1A to which the electrode 2 is bonded is picked up by a pickup device 81 illustrated in FIG. 7 in the fifth position T5 (see FIG. 5). The pickup device 81 includes a suction mechanism and sucks the electrode 2. The pickup device 81 preferably sucks not only the electrode 2, but also a portion of the separator 1A around the electrode 2.

A suction base 80 for sucking the carrier film 3 is provided in the position of picking up the separator 1A. That is, in a state where the carrier film 3 is sucked by the suction base 80, the electrode 2 is picked up by the pickup device 81. Thus, when the separator 1A to which the electrode 2 is bonded is picked up by the pickup device 81, the separator 1A is easily separated from the carrier film, and the separator 1A on the carrier film 3 can be easily sucked.

Figure 8:
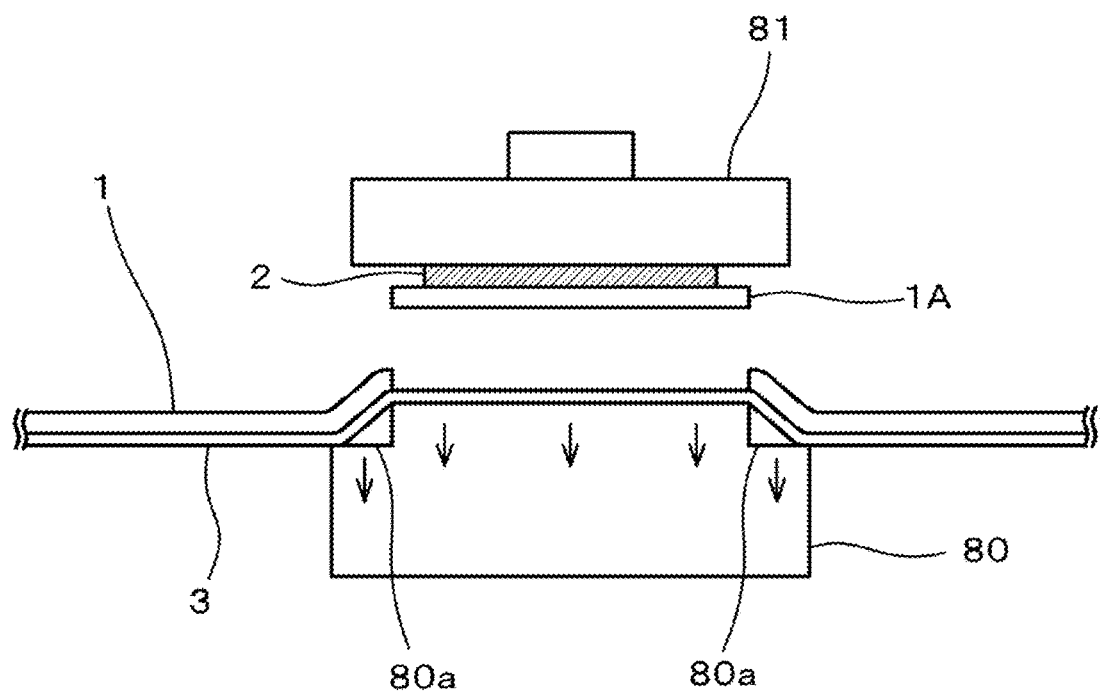
FIG. 8 is a view illustrating a suction base having a structure including a step on an upper surface.

The suction base 80 may have a structure including a step on an upper surface as illustrated in FIG. 8. That is, the upper surface of the suction base 80 is configured to include a step such that upper surfaces 80a at both ends in the extension direction of the separator material 1 become lower. Thus, when the carrier film 3 is sucked by the suction base 80, a portion of the carrier film 3 positioned on the upper surfaces 80a at both ends is sucked and deformed downward. Accordingly, when the separator 1A to which the electrode 2 is bonded is picked up by the pickup device 81, the separator 1A on the carrier film 3 can be more easily sucked.

It is noted that when the aforementioned upper surfaces 80a at both ends have the same height as that of the other upper surface portion but are configured to have a groove, the carrier film 3 is sucked and deformed downward in the groove portion. Therefore, the same effect can be obtained.

With the cutting device 100A of the second embodiment, the elongated carrier film 3 is placed below the elongated separator material 1. Thus, during cutting of the separator material 1, the carrier film 3 functions as a cutting board, and therefore, the separator material 1 can be cut precisely. Moreover, when the carrier film 3 is collected after cutting of the separator material 1, an unnecessary portion of the separator material 1 on the carrier film 3 can be collected simultaneously. Therefore, it is possible to reduce the generation of waste in the cutting position.

Moreover, before the separator material 1 overlaps with the carrier film 3, static elimination is performed on the separator material 1 and the carrier film 3. Therefore, it is possible to suppress the generation of below-indicated problems due to attachment of the carrier film 3 and the separator material 1 because of static electricity or the like. That is, in a case where the carrier film 3 and the separator material 1 are attached to each other, in a subsequent step, there can be a problem that when the separator 1A to which the electrode 2 is bonded is picked up, the separator 1A cannot be picked up, or there can be a problem that the electrode 2 is separated from the separator 1A during pickup. However, it is possible to suppress occurrence of such problems through the status elimination process.

Moreover, it is noted that the present invention is not limited to the aforementioned embodiments, but various applications and modifications may be added within the scope of the present invention. For example, in the second embodiment, the first static elimination device 71 and the second static elimination device 72 are described to correspond to the "static elimination device" of the present disclosure. However, it may be possible to provide only one static elimination device that performs static elimination on the cutting object and the carrier film before the cutting object overlaps with the carrier film.

DESCRIPTION OF REFERENCE SYMBOLS

1: separator material
2: electrode
11: guide
12: cutting mechanism
13: drive device
14: pressing device
14a: extension
15: reception base
16: support
20: feed device
31: first clamp device
32: second clamp device
40: clamp movement device
50: imaging device
60: carrier film feed device
71: first static elimination device
72: second static elimination device
80: suction base
81: pickup device
100: cutting device of first embodiment
100A: cutting device of second embodiment
121: cutting blade
122: die set

The invention claimed is:
1. A cutting device comprising:
a guide that extends in a vertical direction;
a cutting mechanism that includes a cutting blade and is configured to move in the vertical direction along the guide;
a drive device configured to move the guide in a horizontal direction, such that the cutting mechanism is moved in the horizontal direction;
a pressing device configured to press the cutting mechanism downward in the vertical direction;
a reception base configured to receive an object with an elongated shape and to receive the cutting blade during cutting of the object;
a cutting object feed device configured to feed the object in one direction;
a first clamp configured to clamp a first end side of a predetermined region including a cutting object portion of the object;
a second clamp configured to clamp a second end side of the predetermined region of the object; and
a clamp movement device configured to move the first and second clamps in a state of clamping the object when the object is fed in the one direction, wherein the pressing device is configured to press the cutting mechanism downward along the guide to cut the object when placed on the reception base with the cutting blade.

2. The cutting device according to claim 1, further comprising a support configured to support the pressing device, wherein a position of the cutting mechanism relative to the support in the horizontal direction is changed by movement of the guide by the drive device.

3. The cutting device according to claim 1, wherein the one direction is parallel to the horizontal direction.

4. The cutting device according to claim 1, wherein the clamp movement device is configured to adjust a movement speed of the first and second clamps, such that tension in the predetermined region of the object becomes substantially zero.

5. The cutting device according to claim 1, further comprising a carrier film feed device configured to feed an elongated carrier film placed below the object to be cut.

6. The cutting device according to claim 4, further comprising a static elimination device configured to perform static elimination of the object and the carrier film before the object overlaps with the carrier film.

7. The cutting device according to claim 1, further comprising an imaging device configured to capture an image of the object to be cut before the cutting object feed device feeds the object in the one direction.

8. The cutting device according to claim 7, wherein the drive device is configured to move the guide based on at least one of a position and an inclination of the object that is determined based on the captured image of the object.

9. The cutting device according to claim 8, wherein the drive device is configured to move the cutting mechanism in the horizontal direction by moving the guide in at least one of an X-axis direction, a Y-axis direction, and a θ direction based on the at least one of the position and the inclination of the object.

10. The cutting device according to claim 9, wherein the X-axis direction, the Y-axis direction, and the θ direction all extend in a plane parallel to the horizontal direction.

11. A method for cutting an object, the method comprising:
   moving a guide, which extends in a vertical direction, in a horizontal direction to move a cutting mechanism in the horizontal direction that is coupled to the guide and that includes a cutting blade;
   placing, on a reception base, an object having an elongated shape;
   feeding the object in one direction;
   clamping, by a first clamp, a first end side of a predetermined region including a cutting object portion of the object clamping, by a second clamp, a second end side of the predetermined region of the object;
   moving, by a clamp movement device, the first and second clamps in a state of clamping the object when the object is fed in the one direction; and
   pressing, by a pressing device, the cutting mechanism downward along the guide in the vertical direction to cut the object with the cutting blade when the object is placed on the reception base.

12. The method according to claim 11, wherein the one direction is parallel to the horizontal direction.

13. The method according to claim 11, further comprising, adjusting, by the clamp movement device, a movement speed of the first and second clamps, such that tension in the predetermined region of the object becomes substantially zero.

14. The method according to claim 11, further comprising:
   feeding, by a carrier film feed device, an elongated carrier film placed below the object to be cut; and
   performing static elimination of the object and the carrier film before the object overlaps with the carrier film.

15. The method according to claim 11, further comprising:
   capturing an image of the object to be cut before feeding the object in the one direction; and
   moving the guide based on at least one of a position and an inclination of the object that is determined based on the captured image of the object.

16. The method according to claim 15, further comprising moving the cutting mechanism in the horizontal direction by moving the guide in at least one of an X-axis direction, a Y-axis direction, and a θ direction based on the at least one of the position and the inclination of the object.

* * * * *